Sept. 29, 1959 A. L. JUNG 2,906,620
METHOD OF DE-FREEZING AND HEATING DEEP-FROZEN FOODS
Filed Feb. 21, 1956 3 Sheets-Sheet 1

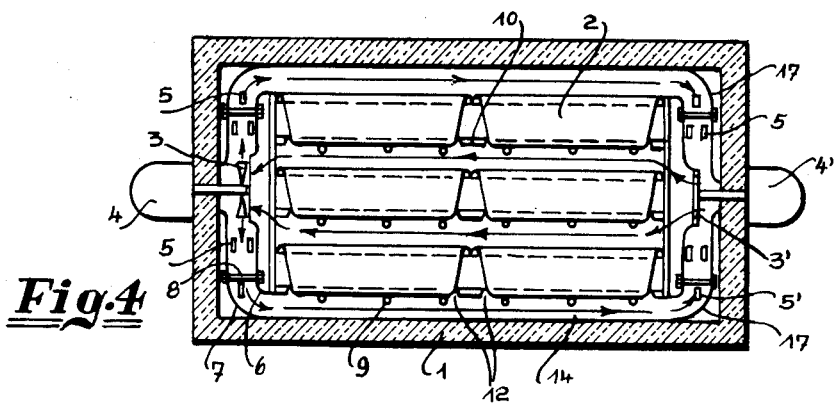
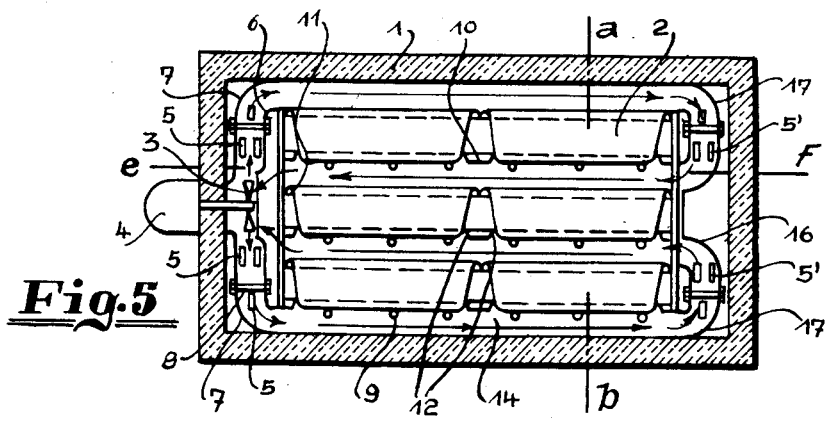
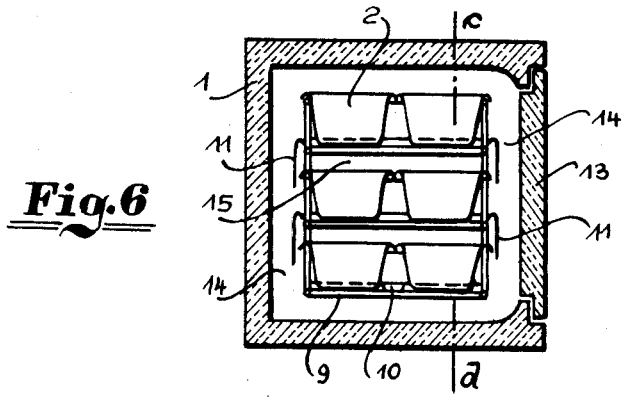

2,906,620

METHOD OF DE-FREEZING AND HEATING DEEP-FROZEN FOODS

Anton Ladislaus Jung, Herborn, Germany, assignor to Burger Eisenwerke G.m.b.H., Burg, Dillkreis, Germany, a German company Application February 21, 1956, Serial No. 566,970

1 Claim. (Cl. 99—1)

It is known to de-freeze foods and prepared meals preserved by deep-freezing or low-temperature cooling by means of so-called de-freezing ovens and to heat them to the temperature suitable for consumption. The procedure being adapted to an increasing degree is for fully prepared complete meals (menus) to be frozen and thus preserved, so that after a certain de-freezing and heating period, the previously cooked meals are ready for the table without any additional work. The method is constantly increasing in importance, particularly for epicurean management, since by this means it is possible to store previously cooked meals. This process has acquired considerable importance in the pantries of aircraft.

In the construction of such devices for heating deep-frozen foods, it is of importance that a largest possible quantity of deep-frozen foods is heated in the shortest possible time to the temperature necessary for serving, and the temperature at all points of the de-freezing oven and thus the so-called de-freezing speed should be as uniform as possible. When using the prior known arrangements, this object is not completely achieved, because with these devices, in which the air heated by electric resistances is circulated by means of fans in the said oven, the suction and pressure sides are only separated aerodynamically at the fan. As a result, it is practically impossible to obviate the possibility of a static air buffer being formed on the side opposite the fan, so that it is not possible for an air circulation reaching all points of the oven to be set up. The heat transfer is thus in part effected only by heat conduction, and it is found from experience that large temperature differences obtain between the individual zones in the de-freezing oven and thus differences in the de-freezing speed.

These defects are overcome by the invention by the fact that for de-freezing and warming deep-frozen foods and especially fully prepared meals, which are stacked alongside and above one another while leaving interstices, by means of a circulated stream of hot air which reaches the foods, the stream of hot air emanating from an air circulating fan is guided as an enveloping stream around the block formed by the foods and is returned between the component blocks arranged one above the other. In carrying this process into effect, using a device for de-freezing and heating deep-frozen foods which consists of a chamber with a multiple-stage rack for receiving the foods and the like or the containers containing the prepared meals, and an air-circulating fan provided with an associated heating device for the circulated stream of air provided by the said fan, the current of hot air is so guided by baffle surfaces that it is conducted as an enveloping current around all sides of the block formed by the containers and is returned to the air-circulating fan between the stages of the block.

It is preferred in this case for the air-circulating fan to be associated with one side of the chamber, its suction side being shut off in relation to the pressure side by a baffle plate following the latter at the encasing duct of the block of containers. Those interstices being formed by the downwardly tapering containers and between the containers disposed one behind the other in the same stage and the superposed stages are closed by baffle plates associated with the rack or the containers, the baffle plates disposed between the stages being advantageously designed as flaps articulated to the rack. In a similar manner, those containers which are located one behind the other in the various stages are sealed off by cover plates arranged on the containers or the rack.

As a result of this design, an air circulation is achieved which uniformly reaches all points of the chamber, so that every particle of air participates therein, whereby it is possible to have a shorter de-freezing and heating time and a substantially constant de-freezing speed in all areas of the chamber. Where temperature differences still occur within the chamber, it is possible to make allowance for these temperature zones by a suitable distribution of the foods to be heated; the articles to be de-frozen are allotted to the corresponding temperature zones in accordance with the amount of heat which the various foods require for de-freezing and heating purposes. By this means, despite the different heating requirements of for example meat and potatoes and the temperature differences existing in the chamber, it is possible to achieve equal de-freezing times for the various foods which are placed in the oven.

These measures of the asymmetrical heat radiation and circulation of hot air guided by baffle surfaces can generally only be employed if the individual foods (parts of a menu) are thawed in separate containers, that is to say, if the separate thawing dishes contain the same foods in each case. It is not possible, or it is not possible satisfactorily, for foods which require different heat quantities for de-freezing purposes, for example, meat, green vegetables and potatoes, to be placed in one dish inside the chamber and de-frozen, since in this case it is impossible to produce a suitable association with the temperature zones. It is in fact necessary always for one type of food to be placed in one container and to allot to this de-freezing dish a place in the chamber which corresponds to its heating requirements. As a result, however, a longer serving time is caused when complete courses are being served, this being due to the necessity of having to take the portions from separate trays. Such an arrangement also has associated therewith the disadvantage that the courses, after being de-frozen and heated, cannot be served in the containers themselves.

It has been shown that a substantially more uniform temperature distribution within the chamber can be achieved if the heater or heaters, for example of an electrical type, serving to heat the circulating air are not arranged only on one side, but on several sides; in one preferred arrangement, heaters are arranged on two sides opposite one another. By this means, there is obtained a hot air circulation combined with a symmetrical heat radiation, this resulting in a further heating (reheating) of the hot air circulated as an enveloping flow around the block formed by the containers and before passing through the stages of the block.

It is of course also possible for the hot air current from the fan to be first conducted between the stages of the block and to the additional (second) heater device and then, after heating (reheating) by the supplementary heater, to be conducted back as an enveloping current around the block formed by the containers.

The possibility is also provided of this arrangement of one or more additional heating resistances being also combined with one or more additional air-circulating devices; in the case where, for example, one heater and also one air-circulating device are arranged on each of two oppositely disposed sides, there is provided a substantially symmetrical arrangement in the de-freezing oven.

As a result of such an arrangement, the effect is obtained that a complete course is arranged in each de-freezing dish and that the dish can simultaneously be used as a serving dish. The slight temperature differences which still exist and which are due to the radiation from two sides are compensated for by an expedient arrangement of the foods or meals in the dishes, in that the meals in the dishes are arranged from the heat radiators (heating resistances) according to decreasing heat requirements, for example in the sequence meat, green vegetables, potatoes.

It thus becomes possible for courses of different compositions and thus different heat requirements to be arranged in one dish and furthermore for several dishes of frozen foods (suitably arranged in the chamber) to be simultaneously de-frozen and heated in a substantially shorter time than with the known arrangements, it being possible for the dishes to be simultaneously used as serving dishes. It is preferred always to place two de-freezing dishes in succession in one stage of the chamber between the heaters disposed for example at the two sides, the components of the menu being placed in these dishes, starting from the heaters at the sides with the foods requiring most heat (for example meat) and following these towards the centre with the foods requiring less heat.

The new construction is more fully explained hereinafter by reference to the drawing, wherein.

Figure 3:
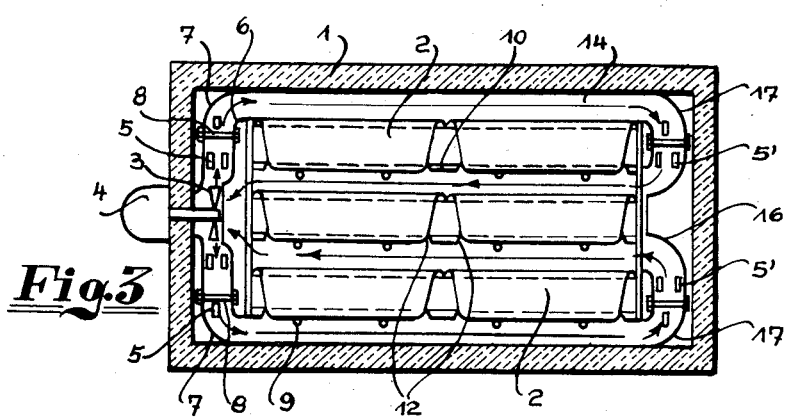
Figure 7:
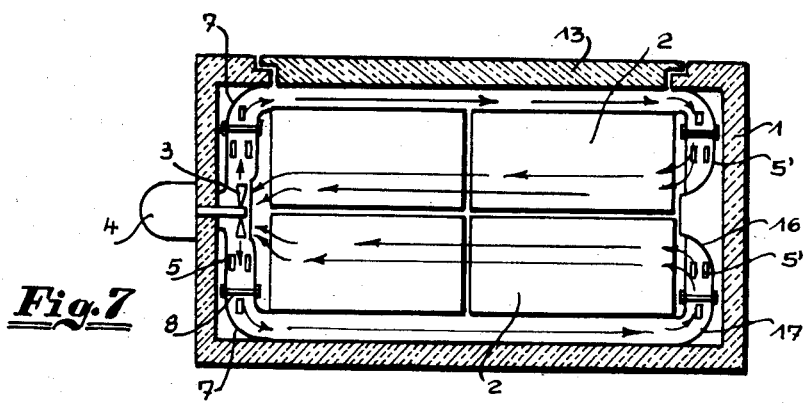

Figure 3 is a constructional form of a de-freezing oven with an air-circulating fan and heater devices arranged at both ends, Figure 4 is a constructional form of a de-freezing oven with heaters and air-circulating fans arranged at both ends, Figures 5 to 7 show an embodiment of the de-freezing oven according to Figure 3, having one air-circulating fan and heaters arranged at both ends, Figure 5 being a section on the line c—d of Figure 6, and Figure 6 a section on the line a—b of Figure 5; Figure 7 is a plan view of a de-freezing oven according to Figure 5.

Figure 8:
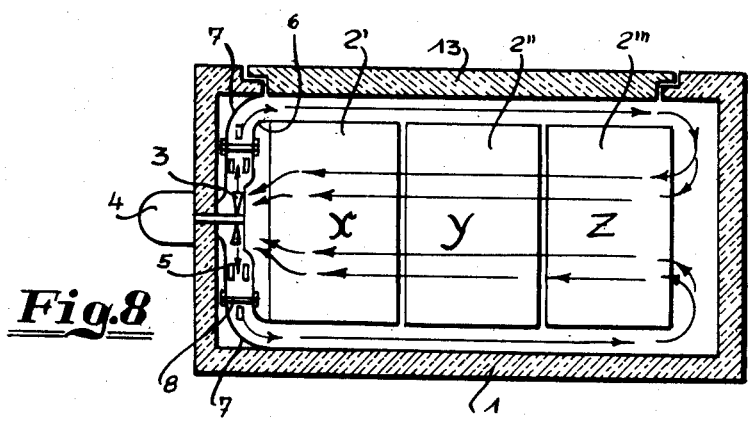
Figure 9:
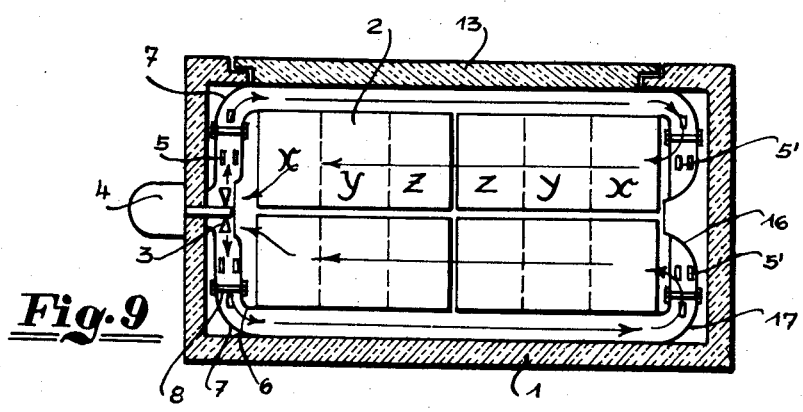

Figures 8 and 9 show the preferred arrangement of the foods (for example, components of a menu) within the de-freezing dishes and the suitable relationship between the dishes and the heater or heaters in the de-freezing oven, Figure 8 showing the usual arrangement according to the main patent and Figure 9 the substantially improved loading and association made possible on the basis of the invention.

Arranged in a preferably insulated oven chamber 1 with a door 13 is a multi-stage rack 9 which serves to accommodate the containers 2 holding the foods to be de-frozen and heated. These containers 2 usually have the form of dishes which taper pyramidically in a downward direction, so that even when these containers 2 are arranged closely adjacent one another, the bases thereof are still at some distance from one another.

Associated with one end wall of the oven chamber 1 is a fan 3 which can be driven by a motor 4 and electric heater coils 5 are arranged on the pressure or delivery side of the fan. The fan 3 thus causes a circulation of the air enclosed by the oven chamber 1, the delivered current of air supplied by the fan being brought to the necessary de-freezing and heating temperature by passing the heater resistances 5.

In order to obtain an air circulation covering the entire air space of the oven chamber 1 and thus a uniform thawing and heating of all containers 2 accommodated in the chamber 1, the pressure or delivery side of the fan 3 is separated from the suction side by a baffle plate 6, which conducts the delivered air to an enveloping duct 14 defined by the side walls of the oven chamber and by the lateral surfaces of the block formed by the containers 2.

In order to prevent this delivered air being prematurely deflected through the interstices between the successive containers or between the separate stages towards the suction side of the fan, baffle plates 10 are provided on the grid 9 to cover these lateral interstices 12 between successive containers 2. The grid 9 also carries flaps 11, which bridge the distance between the separate stages of the grid. The baffle plates 10 and the flaps 11 thus form a practically closed wall surface with the side walls of the containers 2, the warm air coming from the fan 3 being forced to sweep around the complete block formed by the containers 2.

In order to produce a better guiding action on the stream of compressed air originating from the fan 3, the end corners of the oven chamber 1 are also provided with rounded baffle plates 7, these being connected to the baffle plates 6 by screw bolts 8.

The return flow of the air to the suction side of the fan 3 is restricted to the ducts 15 between the separate stages, since the interstices or gaps 12 between the bottoms of successively positioned containers 2 are bridged by the cover plates 10. These plates 10 can also be arranged on the containers 2.

There is thus produced a closed forced circulation of the air and thus a uniform heating of all containers 2 accommodated in the chamber 1, especially if provision is made for the cross-sections of the ducts producing the circulatory path being of such dimensions as to take into account the cooling occurring on this path.

The containers 2 are generally closed by a foil, so that the heating of the material is mainly effected through the walls and the bottoms of the containers, since a certain space is maintained between the foil and the food in the containers. These sealing foils can however also be formed with perforations in order that the foods can also be heated from above. The total cross-section of these perforations in the sealing foils of the individual containers 2 can increase with the distance thereof from the fan 3, in order to compensate for the lowering in temperature of the circulated air current as it travels from and to the fan.

In the modified form as shown in Figure 3, an additional heater 5' is arranged on the side remote from the air-circulating fan 3, the said heater resulting in a supplementary heating (reheating) of the circulating air. For controlling the flow of this circulating air, a baffle member 16 is provided which guides the said air between the stages of the block formed by the containers 2 after the air has been reheated by the heater 5'. In order to prevent too much heat being radiated from the heater elements 5' on to the containers 2, baffle plates 17 are provided and these baffle plates are of such a shape as to assist the guiding of the air stream.

Figure 1:
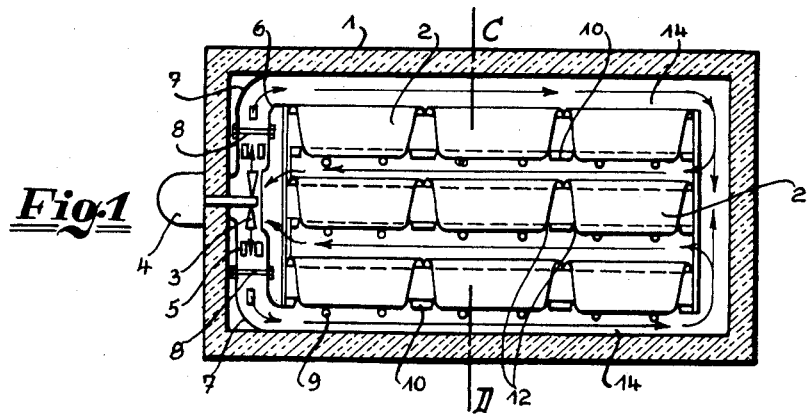
Figure 1 is a section on the line A—B of Figure 2.
Figure 2:
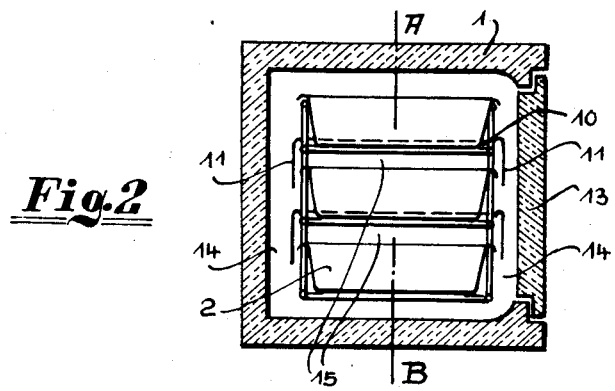
Figure 2 is a section on the line C—D of Figure 1.

In the arrangement shown in Figure 4, an additional air-circulating means 3' driven by the motor 4' is provided as compared with the embodiment shown in Figure 1. The heating (reheating) of the circulated hot air is effected by the heater elements 5' as in Figure 1, and the baffle plates 17 serve to separate the pressure side from the suction side and to guide the current of hot air.

A constructional form according to Figure 3 is again shown in Figures 5, 6 and 7 in three different views. The air circulated by the air-circulating fan 3 is heated at the heater 5, sweeps along between the walls of the oven and the block formed by the containers 2, is again heated (reheated) by the heater 5' and travels between the stages of the block back to the air-circulating fan 3. It is also possible for the air to circulate in the reverse direction, i.e. the air can also be forced by the fan first of all between the stages of the block and then pass around the block formed by the containers 2 back to the fan 3.

The baffle plates and baffle devices 6, 7, 10 and 17 serve to separate the suction side from the pressure side and to guide the current of hot air.

Figure 8 shows the hitherto usual arrangement of the foods (components of a menu) within the de-freezing dishes and the corresponding relationship between the dishes arranged in the oven and the heating system 5 and the air-circulating fan 3. Owing to the circulation air being heated at one end and the heat being radiated at one end by the heater device 5, it was necessary for the components of the courses to be arranged in particular manner in relation to the heater 5. This was done by always only one form of food being placed in one de-freezing dish, and the dishes filled with foods requiring the same amount of heat being arranged in the oven from the heater 5 according to the decreasing heat requirements. With an arrangement according to Figure 8, for example, meat has been placed in the tray 2', green vegetables have been placed in the tray 2'' and potatoes in the tray 2'''; the different types of food are indicated by $x$, $y$ and $z$.

Figure 9 shows the arrangement of the foods within the de-freezing dishes which is possible on the basis of the invention. Due to the symmetrical radiation and heating of the circulating air by the heater devices 5 and 5', it is possible for foods requiring different heating to be arranged in one dish. If the course disposed in a dish and consisting of the components $x$ (high heat requirement, for example, meat), $y$ (lower heat requirement, for example, green vegetables) and $z$ (lowest heat requirement, for example, potatoes) are so arranged that the foods requiring considerable heat (represented by $x$) are in each case directly adjoining the heater devices 5 and 5' and those requiring the least heat (represented by $z$) are arranged most remote from the heater devices 5 and 5', it is possible, in spite of the different heat requirements of the different components of the course, to ensure that the foods are uniformly heated. It is then possible in this case for foods of different composition to be arranged in one dish and at the same time for the dishes to be used as serving dishes.

I claim:

A method of de-freezing and heating deep-frozen foods in shallow containers which are stacked in a block of at least two superposed and spaced stages each formed of rows of at least two containers in a multistage rack of a chamber comprising circulating a current of hot air from one end of the chamber, dividing the current of air into at least two branches, heating each branch of air, directing at least a substantial part of one branch of hot air along and above the upper sides of the containers in the upper stage and in contact therewith, and at least a substantial part of one other branch of hot air along and below the lower sides of the containers in the lower stage and in contact therewith, and parts of the branches of hot air along the lateral sides of the block to the other end of the chamber, and from said other end leading the first branch of air through the space between the stages along the lower sides of the containers of the upper stage back to said one end, and the second branch through the space between the stages along the upper sides of the containers of the lower stage back to said one end, thus enveloping at least the upper and the lower stages and their containers by a stream of hot air and thus enveloping stages intermediate said upper and lower stages with hot air.

References Cited in the file of this patent
UNITED STATES PATENTS

| | | |
|---|---|---|
| 1,893,694 | Bohmker | Jan. 10, 1933 |
| 2,490,076 | Maxson | Dec. 6, 1949 |
| 2,491,420 | Scott | Dec. 13, 1949 |
| 2,561,517 | Ladge | July 24, 1951 |